United States Patent
Feuer et al.

(10) Patent No.: US 7,580,632 B1
(45) Date of Patent: Aug. 25, 2009

(54) METHOD AND APPARATUS FOR MANAGING LIGHTPATHS IN OPTICALLY-ROUTED NETWORKS

(75) Inventors: Mark D. Feuer, Colts Neck, NJ (US); Vinay V. Vaishampayan, Summit, NJ (US)

(73) Assignee: AT&T Intellectual Property II, LP, Reno, NV (US)

( * ) Notice: Subject to any disclaimer, the term of this patent is extended or adjusted under 35 U.S.C. 154(b) by 470 days.

(21) Appl. No.: 11/101,778

(22) Filed: Apr. 8, 2005

Related U.S. Application Data (60) Provisional application No. 60/560,665, filed on Apr. 8, 2004.

(51) Int. Cl.
*H04B 10/08* (2006.01)
(52) U.S. Cl. ............... 398/32; 398/30; 398/31
(58) Field of Classification Search ............ 398/30–32, 398/46, 51, 54, 57, 74, 166, 77
See application file for complete search history.

(56) References Cited

U.S. PATENT DOCUMENTS

| | | | |
|---|---|---|---|
| 6,094,442 A * | 7/2000 | Okamoto et al. ............ 370/506 |
| 6,754,449 B2 * | 6/2004 | Chang et al. .................. 398/51 |
| 6,940,863 B2 * | 9/2005 | Xue et al. .................... 370/401 |
| 2003/0025957 A1 * | 2/2003 | Jayakumar .................. 359/110 |

* cited by examiner

*Primary Examiner*—Dalzid Singh (57) ABSTRACT

A system and method that utilizes digital coding techniques to combine a high-rate data stream with a lower rate side data stream to produce a combined data stream in such a way that the side data can be extracted by an inexpensive, low-bandwidth receiver. The method generally comprises the steps of: combining at least one payload data stream with at least one side data stream into a composite electrical data stream; applying the composite data stream to an optical transmitter to produce an optical signal; detecting the optical signal with an optical receiver having a maximum frequency of operation less than one-half of the rate of the composite data stream; and recovering the side data stream from the electrical output of the optical receiver.

14 Claims, 12 Drawing Sheets

METHOD AND APPARATUS FOR MANAGING LIGHTPATHS IN OPTICALLY-ROUTED NETWORKS

This non-provisional application claims the benefit of Provisional Appl. Ser. No. 60/560,665, entitled "METHOD AND APPARATUS FOR MANAGING LIGHTPATHS IN OPTICALLY-ROUTED NETWORKS," filed on Apr. 8, 2004.

BACKGROUND OF THE INVENTION

The present invention relates generally to optical networking, and more particularly, to a methodology of embedding network management information within individual optical transport streams in a manner enabling the management information to be read by a low-bandwidth, low-cost receiver without having to terminate or decode the full-rate payload stream.

Figure 1A:
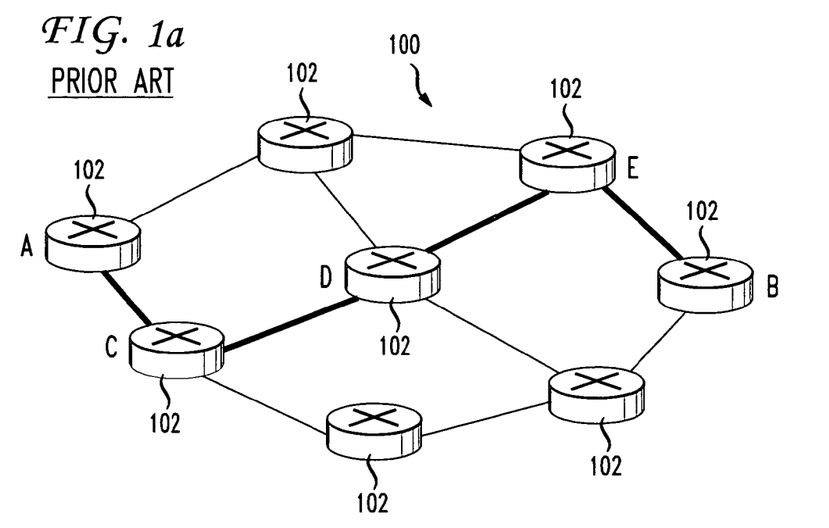
FIG. 1a is a schematic of a conventional optical network where signals passing from node A to node B experience optical-electrical-optical (O-E-O) conversion at intermediate nodes C, D and E.
Figure 1B:
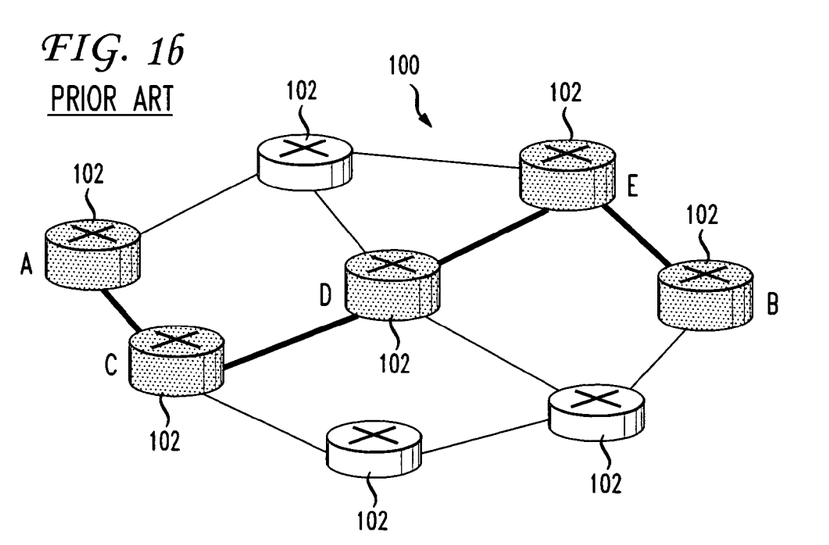
FIG. 1b is a schematic of a conventional optical network where upgrades of the signal format or channel capacity require new equipment at certain intermediate nodes C, D and E and endpoints A and B.

Conventional networks for optical communication transmit information from one node to another as optical signals, but require full conversion of all data from optical form to electrical form at every node. In a ring or mesh network 100 such shown in FIG. 1a, the data may have to traverse many nodes 102 as it passes from the source 102A to the destination node 102B. Thus, the data will be converted from optical to electrical form and back many times before reaching its destination. Equipment associated with these optical-electrical-optical (OEO) conversions makes up the bulk of the capital cost of a conventional optical communication network. In addition, the electrical routing equipment used in the OEO nodes is specific to a particular modulation format and data rate, so that an upgrade to increase the capacity of a particular channel will require replacement of OEO equipment all along the route from source to destination. In the example depicted in FIG. 1b, the intermediate nodes at 102C, 102D, and 102E must all be upgraded to support the connection from node 102A to node 102B. This may incur a substantial expense in both capital and operating budgets associated with channel upgrades, and often results in delays until a complete new build can be finished.

Problems with OEO conversions are particularly pronounced in networks which use Wavelength Division Multiplexing (WDM) technology. WDM allows a single fiber to carry many distinct data channels by encoding each data stream onto its own optical wavelength, and then combining the wavelengths for transport through the fiber. Multiple fiber spans can be concatenated by inserting optical amplifiers between them. Up to 80 wavelengths can be handled in a single amplifier, so the cost per data channel can be greatly reduced through the use of WDM. However, existing WDM networks still require separation of individual wavelengths whenever OEO conversion is needed, and since each OEO converter handles only one wavelength, the cost of OEO routing nodes scales very unfavorably as traffic demands grow.

Figure 1C:
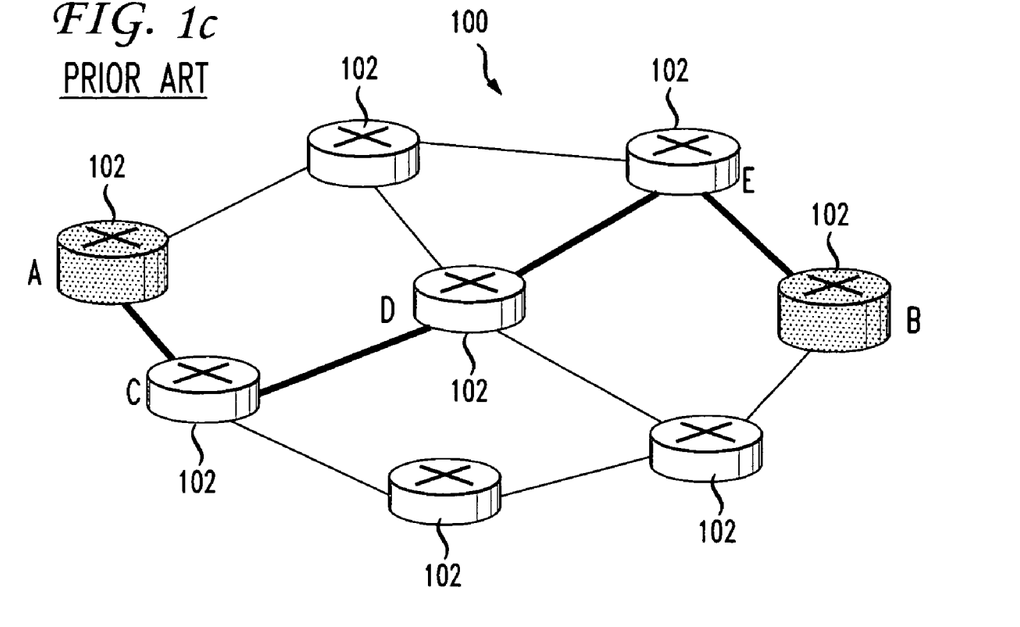
FIG. 1c is a schematic of an optically routed network where the intermediate nodes are transparent to channel rate and format, such that upgrade of the channel between A and B is achieved without changing nodes C, D and E.
Figure 2:
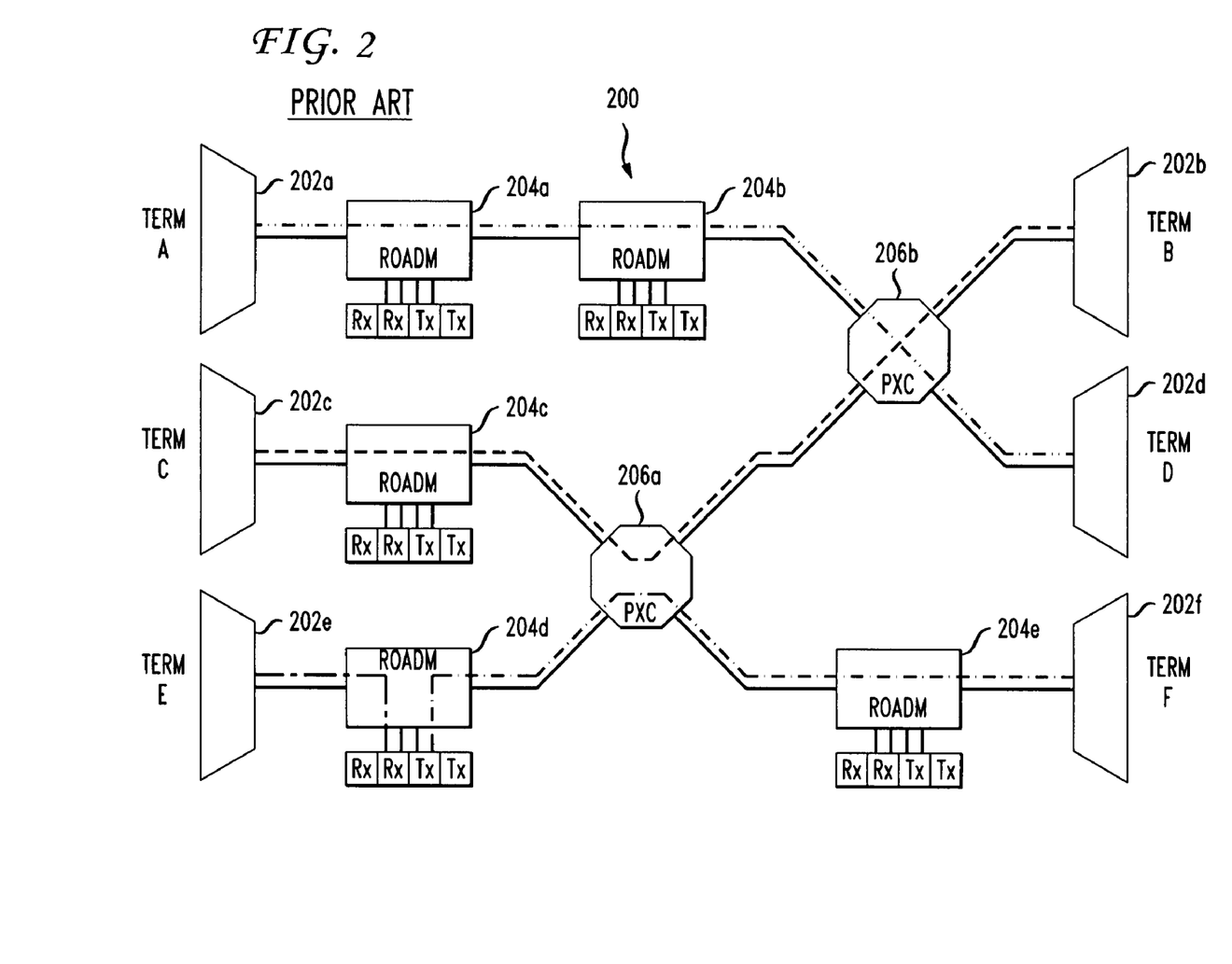
FIG. 2 is a schematic of an optically-routed wavelength division multiplexing (WDM) network.

Optical communication networks with optical-optical (OO) nodes, based on all-optical routing systems which do not require conversion of signals to electronic format, have been developed to greatly reduce the initial capital cost of networks, while providing a flexible method for capacity upgrades of channels. The OO nodes traversed by the optical signal as it passes from source to destination are transparent to modulation format and data rate, so that an upgrade can be achieved by changing the equipment at the source and destination nodes only. In the example of FIG. 1c, the capacity upgrade from node 102A to node 102B is achieved without changes at nodes 102C, 102D, and 102E. Thus, optically-routed networks (ORNs) are expected to yield substantial savings in both capital expense and operating expense associated with channel upgrades. The ORNs being developed today are WDM-capable: that is, the Reconfigurable Optical Add/Drop Multiplexers (ROADMs) and Photonic Cross Connects (PXCs) at the network nodes can control signal routing on a wavelength-by-wavelength basis. The route followed by a wavelength from source node to destination node through the ORN is called a lightpath. FIG. 2 shows an example of an ORN 200 in which four separate data signals are carried on the same wavelength. The solid lines show fiber routes, and the various dotted, dashed, and dot-dashed lines represent the four distinct lightpaths. Here, the terminating points are identified at multiplexer/demultiplexers 202A, 202B, 202C, 202D, 202E and 202F. The network further includes ROADMs 204A, 204B, 204C, 204D and 204E, and PXCs 206A and 206B. If there were a routing error in a ROADM 204 or PXC 206, optical spectra could not detect the fault. Thus, photonic networks need a path trace function to identify ad localize routing errors.

However, existing solutions for ORNs lack several key management functions provided by the OEO nodes in conventional networks. In particular, existing solutions for ORNs provide only very limited capability to trace a signal path through the network. Presence of a particular wavelength at a node is easily checked by optical means, but these methods cannot distinguish between different lightpaths which use the same wavelength. If mechanical failure or operator error causes incorrect routing of an optical signal, so that data is delivered to the wrong destination, the network may be unable to identify the cause and location of the fault.

Figure 3A:
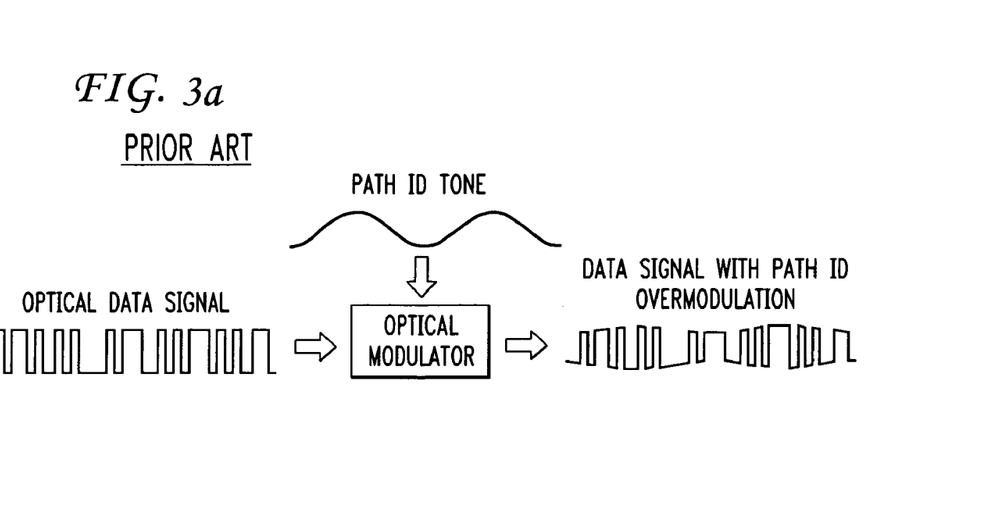
FIG. 3a is a schematic of a tone overmodulation method for providing path ID in the prior art.
Figure 3B:
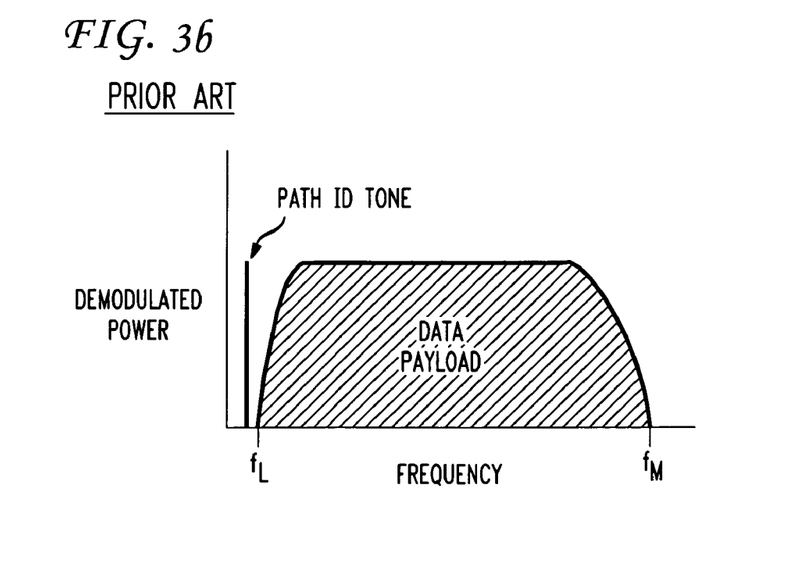

One approach taken in the prior art employs overmodulating the data signal with a low-frequency tone to provide the optical path ID, as shown in FIG. 3a. Since the modulation depth of the Path ID tone must be kept small to minimize degradation of the data payload, the sensitivity of the path ID function is limited. Each lightpath present in the network is assigned a unique tone frequency, so that the lightpaths present at any point can be identified by the pattern of path ID tones present. The ubiquitous detectors for the path ID signal are wavelength-insensitive photoreceivers. These are quite cheap since they operate at low speeds, and there is no need for a tunable optical filter or optical wavelength selector. However, this method requires an extra optical modulator, which adds some cost to the system. A more serious flaw is that the tone is restricted to a very low frequency range, because of the need to avoid interference with the data modulation on the same optical carrier. FIG. 3b shows the power spectrum of the combined modulation by data and path ID tone, and illustrates the strategy of avoiding interference by setting the tone frequency below the low-frequency cutoff of the data modulation. For standard on-off-keyed amplitude modulation (OOK-AM), the low-frequency cutoff of the payload data spectrum, fL, is roughly determined by the data rate and longest sequence of zeroes or ones to be sent. For a 2.5 Gb/s signal with a maximum pattern length of $2^{23}-1$ (typical of a SONET OC-48 signal), all path ID tones must be kept below a specified threshold, which leads to several problems. First, the number of distinguishable tones is limited, so it may be difficult to find a unique tone to label each lightpath in the network. Second, modulation at these very low frequencies leads to cross-gain modulation in the optical amplifiers in the network, thereby causing unintended 'ghost' tones to appear on other wavelengths passing through the same optical amplifier. Third, the bandwidth available for tone overmodulation decreases with lower data rates, making this approach impractical for slower SONET signals, such as OC-12 (622 Mb/s) or OC-3 (155 Mb/s).

SUMMARY OF INVENTION

It is an object of the invention to embed a unique optical path identifier (path ID) into each optical signal in the network, so that each lightpath can be traced throughout the ORN.

It is a further object of the invention to provide an in-band management channel for lightpaths in a system that utilizes inexpensive detector mechanisms, so that path ID detectors can be ubiquitous, to permit path tracing and fault localization to very precise locations within the network.

It is another object of the invention to provide an in-band management channel for lightpaths in a system that desirably employs a path ID detector at each OO node.

It is another object of the invention to permits the path ID signal to operate at higher, but still moderate, frequencies where the cross-gain modulation is insignificant.

It is yet another object of the invention to provide an in-band management channel for lightpaths in a system where Path IDs are distinguished in the receiver by a digital decoding process which does not require narrow bandpass filtering.

In accordance with an aspect of the present invention, a method of transmitting management information in an optical communication network is provided. The method comprises the steps of: combining at least one payload data stream with at least one side data stream into a composite electrical data stream; applying the composite data stream to an optical transmitter to produce an optical signal; detecting the optical signal with an optical receiver having a maximum frequency of operation less than one-half of the rate of the composite data stream; and recovering the side data stream from the electrical output of the optical receiver. The at least one payload stream is advantageously combined with the at least one side data stream using a digital coding process.

In accordance with another aspect of the invention, a method of transmitting management information in an optical communication network comprises the steps of: combining at least one payload data stream with at least one side data stream into a composite electrical data stream; applying the composite data stream to an optical transmitter to produce a first optical signal; multiplexing the first optical signal with a second optical signal of differing wavelength to create a wavelength-multiplexed signal; receiving the wavelength multiplexed signal with a wavelength non-selective optical receiver; and recovering the side data of said first optical signal from the electrical output of said wavelength non-selective optical receiver.

In accordance with yet another aspect of the invention, a system for transmitting management information in an optical communication network is provided. The system comprises: an encoder for combining at least one payload data stream with at least one side data stream into a composite electrical data stream; an optical transmitter for receiving the composite data stream and producing an optical signal; a receiver for detecting the optical signal, the receiver having a maximum frequency of operation less than one-half of the rate of the composite data stream; and a decoder for recovering the side data stream from the electrical output of the optical receiver.

These and other advantages of the invention will be apparent to those of ordinary skill in the art by reference to the following detailed description and the accompanying drawings.

BRIEF DESCRIPTION OF THE DRAWINGS

FIG. 3b is a graph of the power spectrum of the combined modulation by data and path ID tone of the methodology depicted in FIG. 3a;

DETAILED DESCRIPTION OF THE PREFERRED EMBODIMENTS

Figure 4:
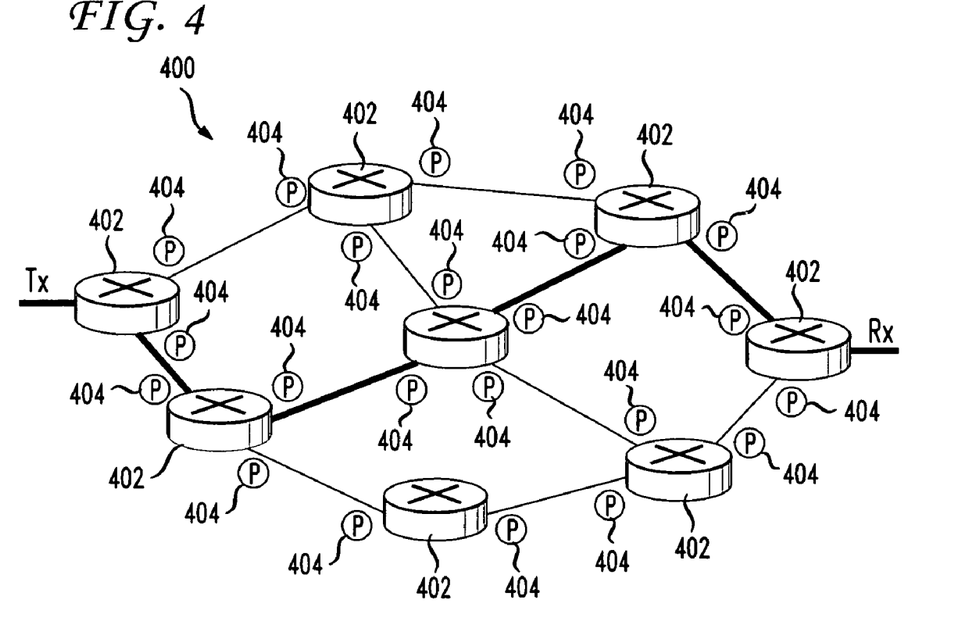
FIG. 4 is a schematic of an optically routed network in accordance with an aspect of the present invention.

In accordance with an aspect of the present invention, digital coding techniques are employed to combine a high-rate data stream (i.e., the data payload) with a lower rate side data stream (e.g., a path ID code) to produce a combined data stream in such a way that the side data can be extracted by an inexpensive, low-bandwidth receiver. As shown in FIG. 4, an optically routed network (ORN) 400 includes a plurality of nodes 402 and a plurality of low-cost side data receivers 404 that are deployed in a ubiquitous way throughout the network. A payload data receiver is deployed only at the destination node. Ideally, these side data receivers 404 should be able to operate without a wavelength-selective filter, implying a multiple-access environment for the side data users. At any given point in the network, the maximum number of users will be limited to U, the number of wavelengths used by the optical equipment, though the total number of lightpaths could be much larger. The present invention addresses multiple access issues by assigning unique signatures to each lightpath during the side data coding process.

Figure 5A:
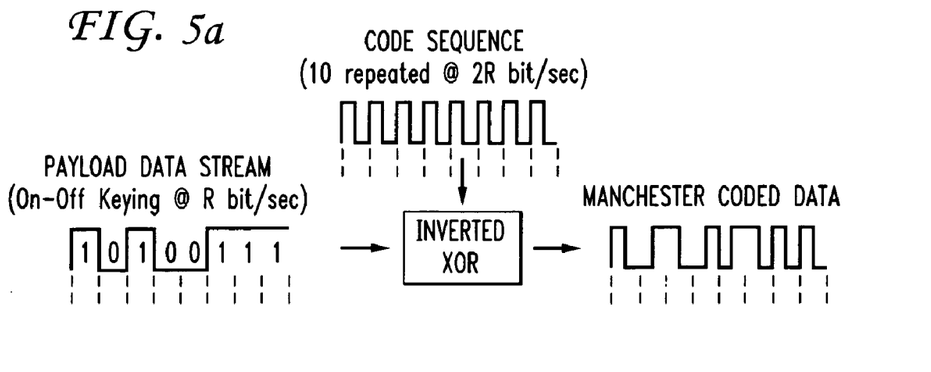
FIG. 5A is a schematic of a Manchester coding scheme.
Figure 5B:
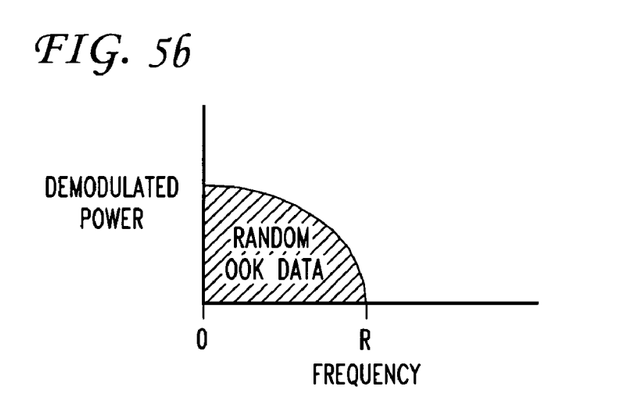
FIG. 5B is a graph of the Manchester coding scheme showing the spectrum of a payload stream in the region of zero frequency.
Figure 5C:
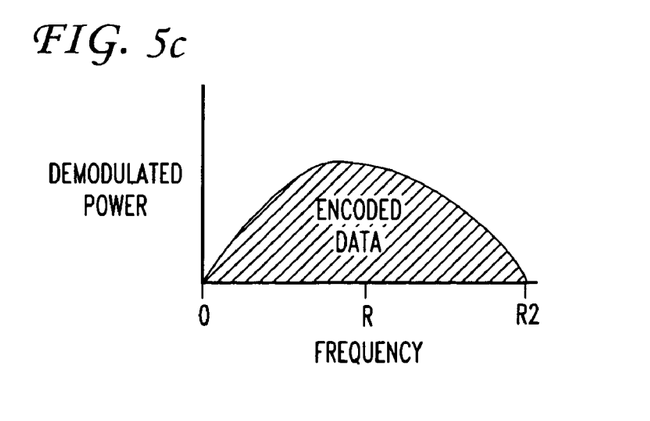
FIG. 5C is a graph of the Manchester coding scheme showing the spectrum of the payload stream shifted to a region around frequency R.

Digital coding is a well-known tool of radio-frequency and optical communication systems. In general, digital coding takes one or more payload data streams and one or more code sequences as inputs, and performs logic operations on those inputs to produce one or more output data streams with spectral and temporal characteristics that enhance transmission or detection. One example is Manchester coding as shown schematically in FIG. 5A, which shifts the spectrum of a payload stream to remove signal energy from the region of zero frequency (see FIG. 5B) to a region around frequency R (see FIG. 5C), thereby enabling use of an ac-coupled channel. Another example is Forward-Error-Correction (FEC) coding, such as that described by ITU standard G.975, which uses digital coding to stretch each data bit temporally and build in redundancy, resulting in improved immunity to channel noise.

Figure 6A:
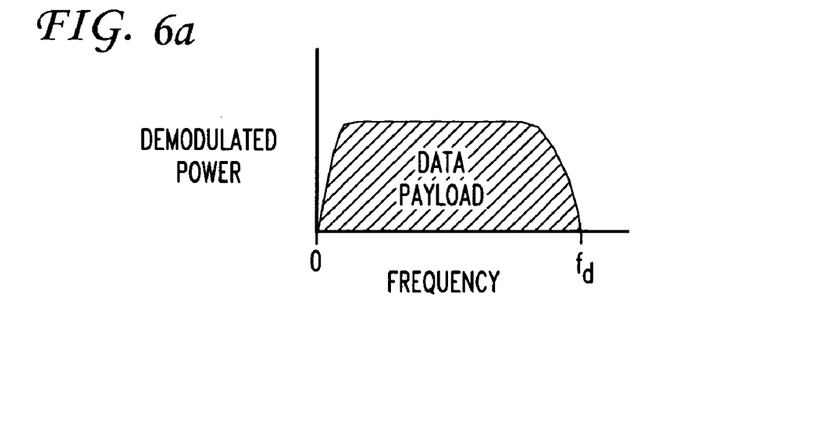
FIG. 6A is a graph of a coding scheme showing the original random sequence of payload data.
Figure 6B:
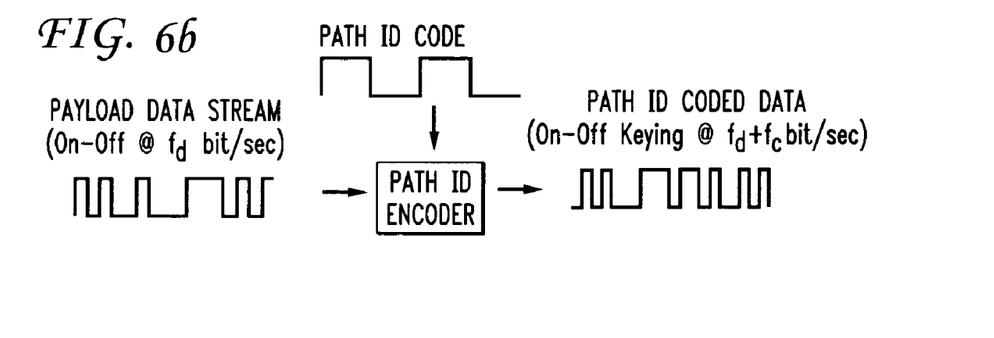
FIG. 6B is a schematic of a coding process in accordance with an aspect of the present invention.
Figure 6C:
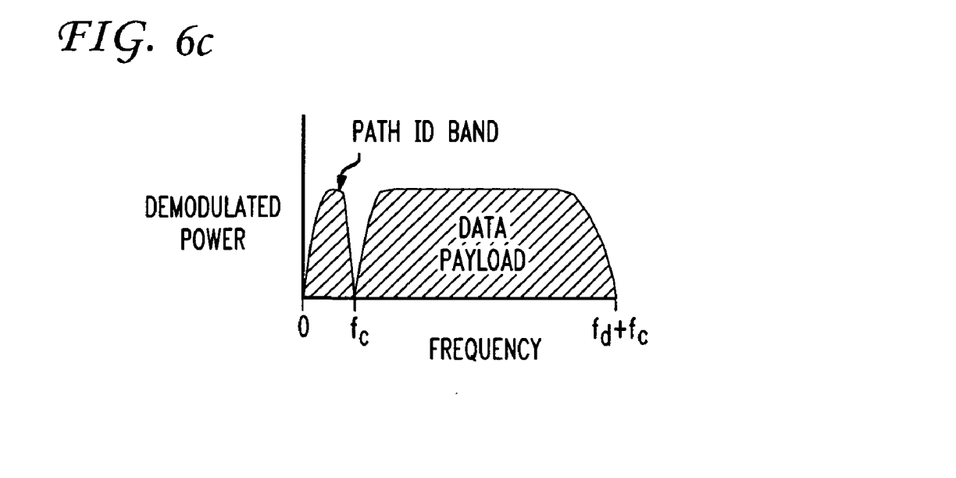
FIG. 6C is a graph showing the path ID band and data payload after coding.

One implementation of the present invention may be understood by considering the power spectra shown in FIGS. 6A-C. As shown in FIG. 6A, the original random sequence of payload data has important spectral components ranging from near-zero frequency up to approximately the payload data rate fd. The coding process (FIG. 6B) utilizes a path ID encoder 600 to shift this information content up in frequency by fc, leaving a band of lower frequencies below fc available to carry the path ID or other management information (see FIG. 6C). The path ID signal has a much lower data rate than the payload, so the fractional increase in bandwidth demanded from the payload receiver is quite small (i.e. (fc/fd)<<1). The proposed coding algorithm also inserts the path ID signal into the open frequency band created below fc. Thus, a low-frequency receiver will detect only the path ID signal. These low-bandwidth receivers are low in cost, and they can operate at a much lower level of optical input power than a high-speed receiver, since the noise power decreases along with the receiver bandwidth.

Since the path ID receiver operates on all wavelengths simultaneously, we have a classic multiple access situation, and the path ID coding scheme must accommodate this. That is, the path ID signal at any given node will include components encoded on many wavelengths, generated at many different source nodes, and the path ID receiver must be capable of distinguishing these components. For a simple example, one might design a coding scheme so that each path ID code sequence produces a unique tone when the signal is detected by a low-frequency receiver. The result would be similar to the tone overmodulation method, with two important differences: the number of distinguishable tones could be increased, and lower payload data rates could be used without interference problems.

For a more sophisticated multiple access strategy, Code Division Multiple Access (CDMA) and Orthogonal Frequency Division Multiplexing (OFDM) offer two well-known approaches. Note that this would not be optical CDMA, but electrical CDMA used to share the Path ID band. For either CDMA or OFDM, the bandwidth needed is approximately proportional to the information transfer rate desired. For example, suppose it is desired to support an 80-wavelength network with 100 nodes, and to detect the path ID word in 1 ms. Then each OFDM channel could be assigned to one wavelength, and a 7-bit path ID word could identify the source node. The data rate required within each OFDM channel would be 7 kb/s, and the total bandwidth needed would be about 560 kHz. To minimize the crosstalk in optical amplifiers, the path ID signals should operate at frequencies above 0.3 MHz. Thus, one can estimate fc=0:9 MHz, which is consistent with low-cost receivers for path ID. There is a negligible increase in the bandwidth needed from the high-speed data receiver at the terminal.

More generally, one can replace the fixed path ID word by a time-varying data stream that carries network management information. Such an Inband Supervisory Channel (ISC) might provide distribution of network routing tables, a voice wire for communication between offices, or element manager communications needed to monitor the health of components and subsystems throughout the network domain. In this light, the coding process is seen as a form of asymmetric multiplexing, in which digital coding combines a high-rate data stream and a low-rate data stream into a single data stream. One aspect of the present invention is that the low-rate data stream can be extracted by an inexpensive receiver with low bandwidth. In a straightforward extension of the example discussed above, the path ID word can be extended to 16 bits and the rate for each OFDM channel increased to 16 kb/s. Then the path ID function can still be accomplished within 1 ms, and a dedicated ISC with data rate of about 9 kb/s would be available to each lightpath, while the total bandwidth used by the path ID/ISC band would increase to ~1.3 MHz. This method does not require media access control (MAC) of the ISC band. Alternatively, by implementing a MAC protocol, OFDM channels dedicated to ISC use could be assigned to nodes which need them, allowing higher ISC data rates and more flexible use of the ISC bandwidth.

The present invention does not necessarily require that payload data streams and side data streams occupy mutually exclusive frequency bands. Payload and side data streams can coexist within a shared frequency band as long as the coding/detection scheme assures that the various message streams are mathematically orthogonal, or even quasiorthogonal. This approach is described in more detail hereinbelow.

When several lightpaths share a fiber, and a side data receiver without wavelength selection is used, the side information bits from different lightpaths get superposed. The channel is thus a multiple access channel and it becomes necessary to code for this form of interference. A spread spectrum approach seems to be natural here. However, the shared medium problem is quite unusual, due to the fact that the bandwidth of the spread spectrum signal, though much higher than the side channel rate, is several orders of magnitude smaller than the payload rate. Furthermore, the application requires that the receiver for the side information operate with much lower analog bandwidth than the receiver for the payload signal. Finally, the method should work with conventional optical communication systems, making it highly desirable to use on-off keying (OOK) as the physical transmission format.

Figure 7:
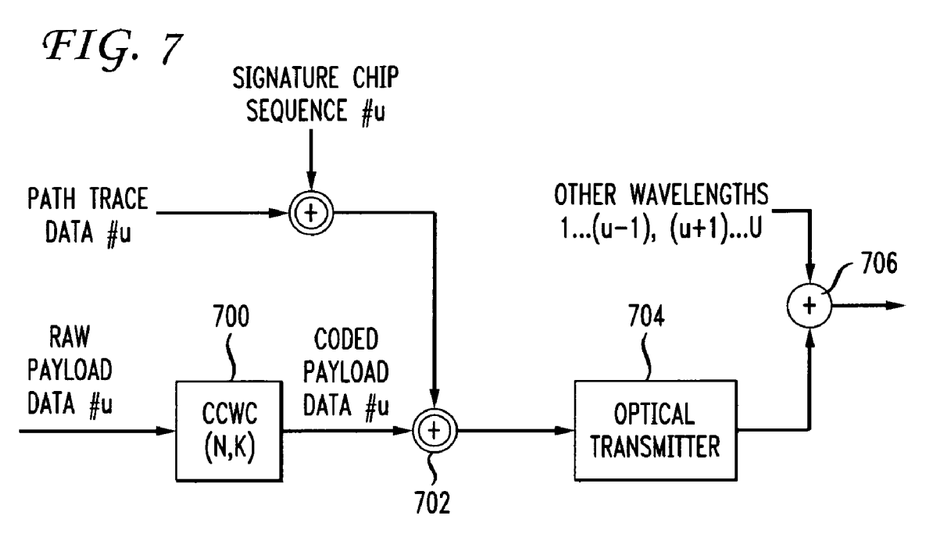
FIG. 7 is a schematic of an encoding transmitter in accordance with an aspect of the invention.

An encoding transmitter in accordance with an aspect of the invention is depicted in FIG. 7. K information bits select a codeword from a complementary constant weight code (CCWC) of length N-bits at 700. The code consists of 2K+1 codewords, half of constant weight W (W<N) and the other half of weight N−W obtained by complementing each codeword in the first group. The information bits always select a codeword of weight W. Groups of codewords are output in serial order and xor'ed with a spreading sequence which has been modulated at 702 by the side information (path trace data). This xor'ed bit stream is used to generate an on/off key (OOK) signal at a specific wavelength and transmitted at 704 over the optical fiber. The OOK signal is optically combined at 706 with other wavelengths (each with its own path trace stream) for transmission over the fiber network. The following bit streams are associated with each lightpath or user u, each at a different time scale: the raw payload bit stream with a bit duration $T_{pr}$; the coded payload bit stream $\{b^a(n)\}$ with a bit duration $T_p$; the signature bit stream $\{b^c(n)\}$, a periodically repeated signature sequence of C chips, with chip duration Tc; and the side data stream $\{b^s(n)\}$, with a bit duration $T_f$. (The subscript u identifying the lightpath will be added when necessary.) Streams of different rates are combined using the xor function to yield a stream at the higher of the two rates: e.g., we obtain $b^{cs}(n)=b^c(n)\oplus b^s(\lfloor n/C \rfloor)$. We use the special notation $b^e(n)$ for $b^{acs}(n)$. In other words, the signature stream is modulated by the side data bit stream, and the resulting stream modulates the coded payload bit stream.

Figure 8:
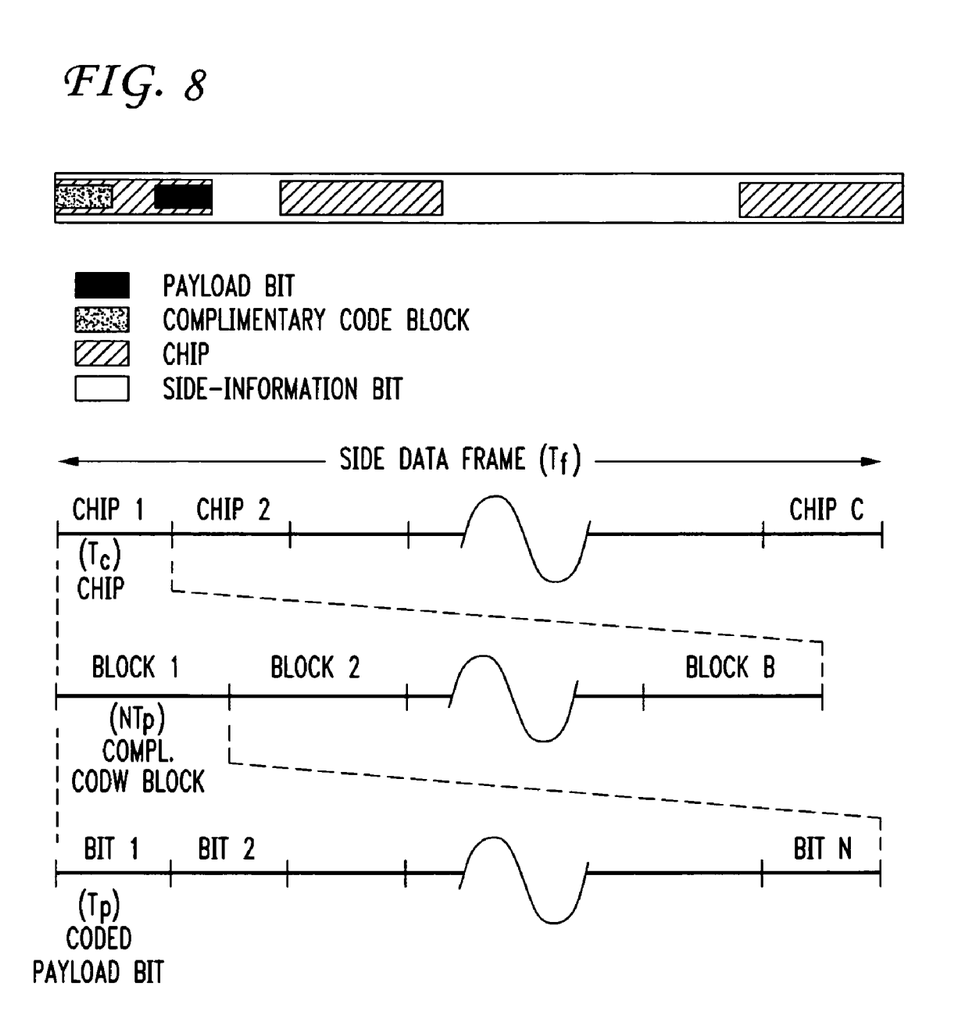
FIG. 8 is a schematic of the structure of an encoded data frame.

The structure of the encoded data frame is shown in FIG. 8. Each block of the CCWC code is N bits long, B such blocks constitute a single chip of the spreading sequence and C chips of the spreading sequence constitute a single period of the spreading code—hereafter referred to as a frame—of equivalent duration as a side information bit. Thus each chip of the spreading sequence has a duration of $T_c = NBT_p$ secs. Since side information bits are transmitted using nonoverlapping but contiguous blocks of the spreading sequence, the frame duration is given by $T_f = CT_c = CNBT_p$ secs.

Figure 9:
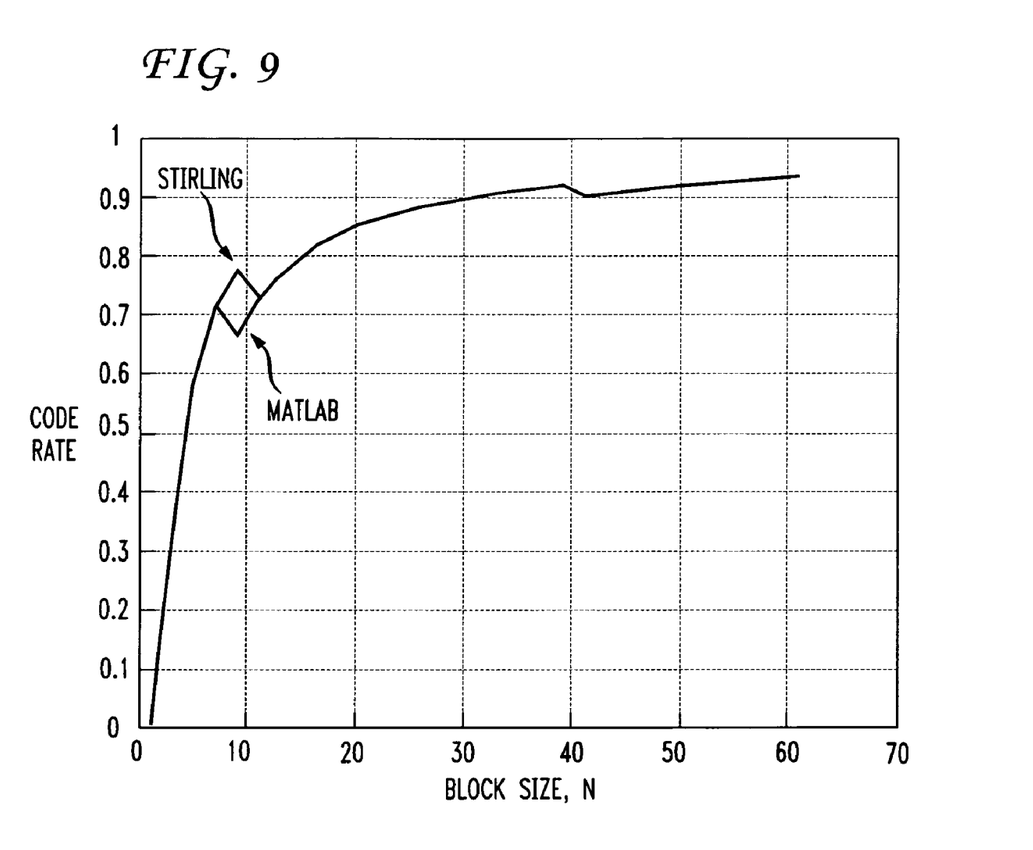
FIG. 9 is a graph depicting the block coding efficiency.

FIG. 9 shows the block coding efficiency (K/N) achievable using CCWCs as a function of the codeword length N using Stirling's formula and Matlab. For N>32, the efficiency exceeds 90%. Fast encoding methods exist for these constant weight codes, including enumerative techniques (see, e.g., T. M. Cover, "Enumerative Source Coding," IEEE Trans. Inform. Th., Vol. IT-19, pp. 73-77, January 1973, incorporated by reference herein) and techniques based on arithmetic coding (see, e.g., T. V. Ramabadran, "A Coding Scheme for m-out-of-n Codes," IEEE Trans. Commun., Vol. 38, pp. 1156-1163, August 1990, incorporated by reference herein).

Figure 10A:
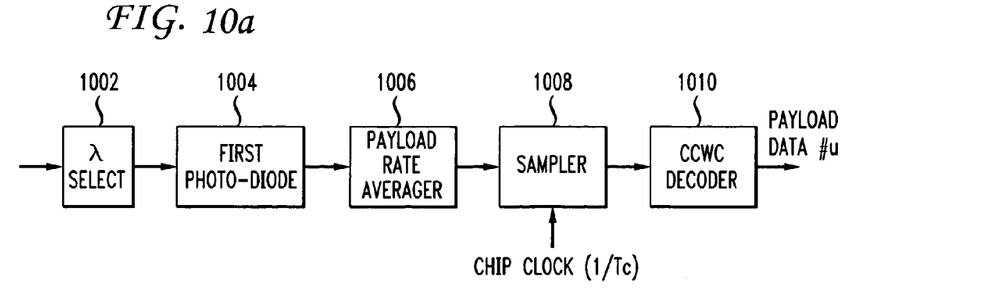
FIG. 10a is a schematic of a payload data receiver.
Figure 10B:
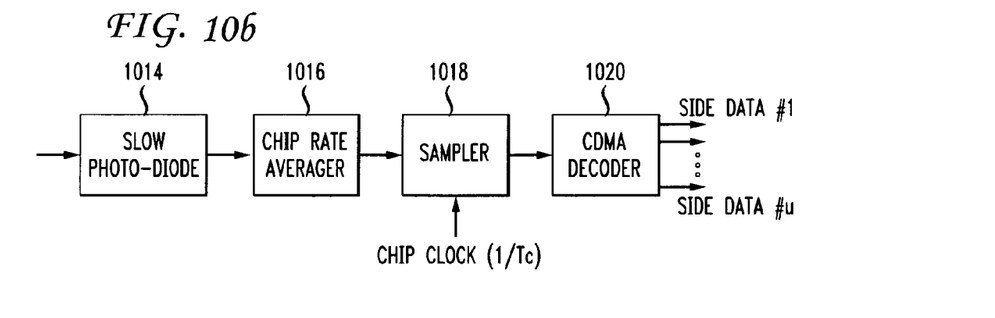
FIG. 10b is a schematic of a path trace receiver.

FIGS. 10A and 10B are schematics of two exemplary decoding receivers in accordance with the present invention. As shown in FIG. 10A, the payload receiver 1000 is a standard WDM design, with a wavelength selector 1002 and bandwidth adequate to receive the coded payload bits. The wavelength selector 1002 communicates with a fast photo-diode 1004. The fast photo-diode 1004 is coupled to a payload rate averager 1006, which in turn connects to a sampler 1008. The sampler 1008 receives an input from a payload bit clock ($1/T_p$). The output of the sampler 1008 is input to a CCWC decoder 1010, which outputs payload data. As shown in FIG. 10B, the path trace receiver 1012 is designed to operate from a 20 dB monitor tap coupler. The path trace receiver 1012 does not have a wavelength selector like the payload receiver. It employs a low speed photodiode 1014, and averages the signal over a chip interval (typically ~$10^{-6}$ s) at a chip rate averager 1016. The averaged signal is sampled at 1018 and applied to a matched filter to detect the desired signature sequence at decoder 1020. The decoder 1020 outputs the side data streams.

In an optically-routed network, wavelengths may enter or leave the network at different nodes, so there can be wide variation of the optical signal-to-noise ratio (OSNR) among channels. The path trace receiver experiences ASE noise from all wavelength channels, leading to a multidimensional analysis problem. In the worst-case scenario, all λ channels are operating at the OSNR level of the worst λ. Then it can be shown that the electrical current signal-to-noise ratio of the path trace data is:

$$snr = \frac{2\Phi LR(1 - 2W/N)\sqrt{C}}{\sigma_{frame}}$$

where, $$\sigma_{frame} = \frac{1}{T_c}\left(\frac{U}{2}(\sigma^{s-sp})^2 + (\sigma^{sp-sp})^2 + (\sigma^c)^2\right)$$

$$(\sigma^{s-sp})^2 = 2\frac{(\Phi LR)^2}{\Gamma}\left(\frac{1}{12.5\text{ Ghz}}\right)$$

$$(\sigma^{sp-sp})^2 = U\frac{(\Phi LR)^2}{\Gamma^2}\left(\frac{B_o}{12.5\text{ Ghz}}\right)$$

Here, Φ is the average optical power, L is the tap coupler loss, R is the responsivity, Γ is the OSNR, $B_o$ is the optical bandwidth, $\sigma^{s-sp}$ is the signal-spontaneous noise, $\sigma^{sp-sp}$ is the spontaneous-spontaneous noise, and $\sigma^c$ is the (constant) circuit noise.

Figure 11:
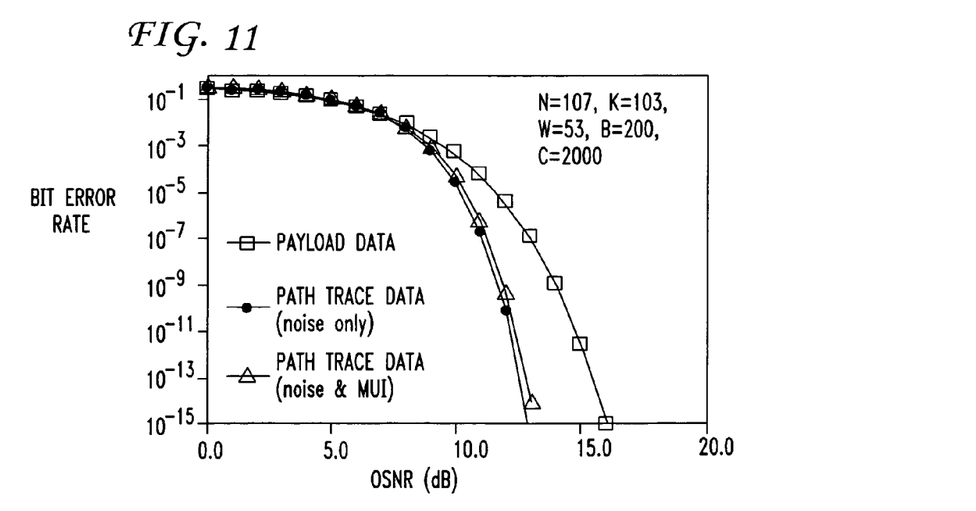
FIG. 11 is a graph of the bit error ratio for path trace data vs. optical signal-to-noise ratio (OSNR)

The snr shown above can be used to compute the noise-induced bit error rates for the path trace data, plotted as a function of OSNR in FIG. 11. The raw payload rate was 10.00 Gb/s, the overhead was 3.9%, the chip rate was 485 kHz, and the path trace data rate was 0.24 kb/s per wavelength, allowing a 16-bit path trace label to be detected in 66 ms. System parameters were U=80, Φ=1 mW, R=100 A/W, L=0.01, $B_o$=4.0 THz, and $\sigma^c$=0.2 nA/(Hz)$^{1/2}$, values appropriate for a moderate-bandwidth InGaAs PINFET receiver. For comparison, the bit-error rates for the encoded payload data are also shown. The plots show that the path trace data can be reliably received under any noise conditions suitable for the 10 Gb/s payload transmission.

Since the path trace receiver receives all λs simultaneously, multi-user interference (MUI) must also be accounted for. For general applicability, we consider the asymptotic limit when γ=U/C is held constant and C tends to infinity. The limits will further depend on the detection algorithm and the presence of synchronization among the users. For a decorrelating detector in an asynchronous system, assuming randomly-chosen signature sequences and random relative delays, the snr should be depreciated by a factor $(1-2\gamma)^{1/2}$ when computing the error rate. This limit is used to plot the bit error ratio in the presence of MUI in FIG. 11. Thanks to the long signature sequence, the MUI penalty is very small.

Figure 12:
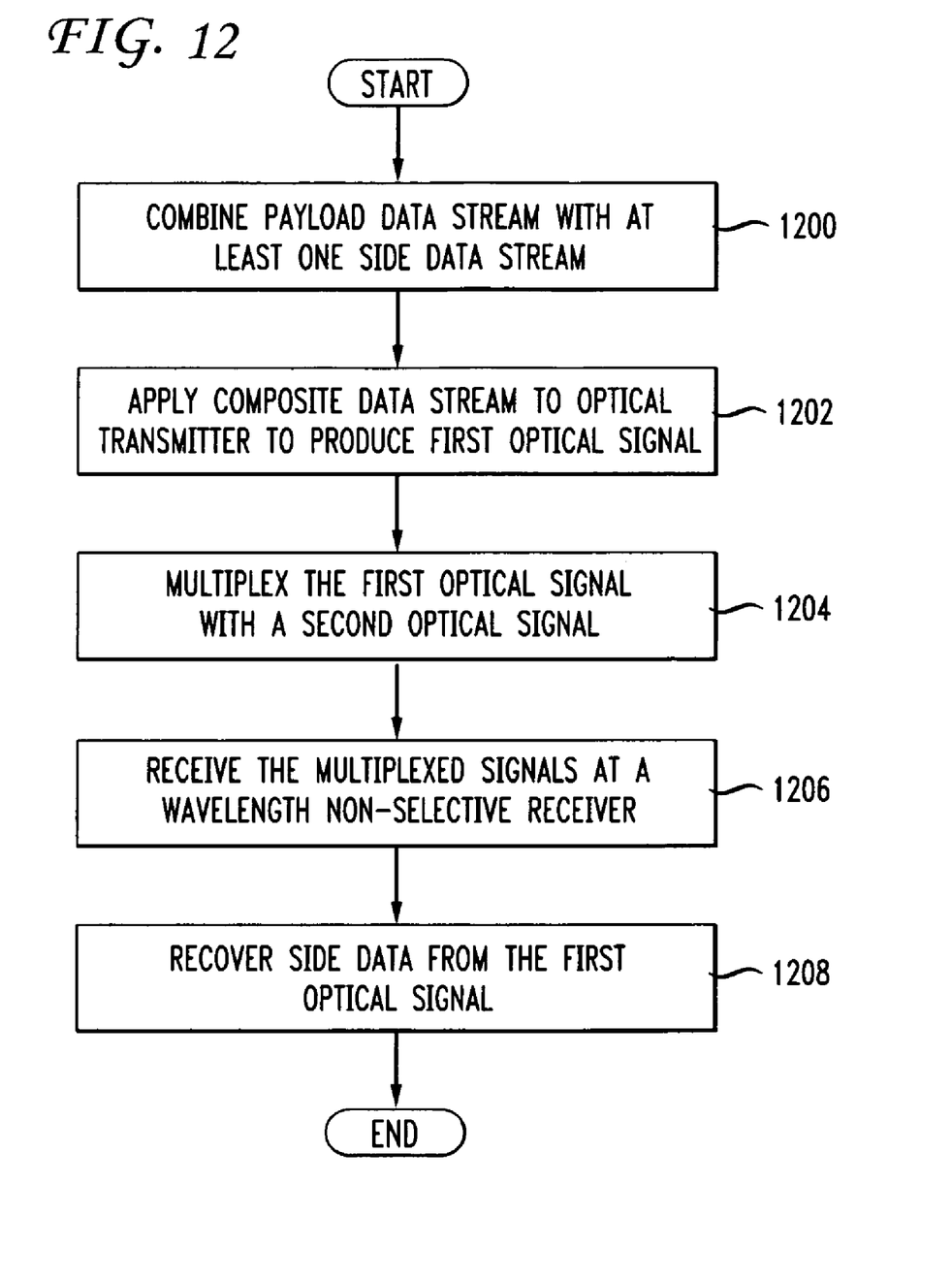
FIG. 12 is a flowchart of a method in accordance with an aspect of the present invention.

Referring now to FIG. 12, there is depicted a flowchart for carrying out a method in accordance with an aspect of the present invention. In step 1200, at least one payload data stream is combined with at least one side data stream into a composite electrical data stream. In step 1202, the composite data stream is applied to an optical transmitter to produce a first optical signal. In step 1204, the first optical signal is multiplexed with a second optical signal of differing wavelength to create a wavelength-multiplexed signal. In step 1206, the wavelength multiplexed signal is received with a wavelength non-selective optical receiver. In step 1208, the side data of said first optical signal is recovered from the electrical output of said wavelength non-selective optical receiver.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. A method of transmitting a path ID in an optical communication network, comprising the steps of:
   combining at least one payload data stream with at least one side data stream comprising the path ID into a composite electrical data stream;
   applying the composite data stream to an optical transmitter to produce an optical signal;
   detecting the optical signal with an optical receiver having a maximum frequency of operation less than one-half of the rate of the composite data stream; and
   recovering the side data stream from the electrical output of the optical receiver.

2. The method recited in claim 1, wherein the at least one payload stream is combined with the at least one side data stream using a digital coding process.

3. The method recited in claim 1, wherein the at least one side data stream is received at least one location which is neither the source nor the destination of the lightpath that carries the side data.

4. The method recited in claim 1, further comprising the step of multiplexing at least two optical signals of differing wavelength.

5. The method recited in claim 4, wherein the optical receiver is wavelength non-selective.

6. The method recited in claim 1, further comprising the step of using the recovered side data to identify the source or destination of at least one optical signal present at the side data receiver.

7. The method recited in claim 1, further comprising the step of using the recovered side data to assess the signal quality of the at least one optical signal present at the side data receiver.

8. The method recited in claim 1, further comprising the step of using the recovered side data to implement quality of service controls on the at least one optical signal present at the side data receiver.

9. The method recited in claim 1, further comprising the step of using the side data stream to carry at least one control signal, which directs a change in the state of a network element or component.

10. The method recited in claim 1, further comprising the step of using the side data stream to transmit at least one alarm signal, indicating a condition in the network which requires attention.

11. A system for transmitting a path ID in an optical communication network, comprising:
    an encoder for combining at least one payload data stream with at least one side data stream comprising the path ID into a composite electrical data stream;
    an optical transmitter for receiving the composite data stream and producing an optical signal;
    a receiver for detecting the optical signal, the receiver having a maximum frequency of operation less than one-half of the rate of the composite data stream; and
    a decoder for recovering the side data stream from the electrical output of the optical receiver.

12. The system recited in claim 11, wherein the encoder is adapted to combine the at least one payload data stream with the at least one side data stream using a digital coding process.

13. The system recited in claim 11, further comprising a multiplexer for multiplexing the optical signal from the optical transmitter with a second optical signal of differing wavelength to create a wavelength-multiplexed signal.

14. The system recited in claim 11, wherein the optical receiver is wavelength non-selective.

* * * * *